United States Patent [19]

Hapner et al.

[11] Patent Number: 5,692,183
[45] Date of Patent: Nov. 25, 1997

[54] METHODS AND APPARATUS FOR PROVIDING TRANSPARENT PERSISTENCE IN A DISTRIBUTED OBJECT OPERATING ENVIRONMENT

[75] Inventors: Mark W. Hapner, San Jose; Alan Snyder, Palo Alto, both of Calif.

[73] Assignee: Sun Microsystems, Inc., Mountain View, Calif.

[21] Appl. No.: 414,770

[22] Filed: Mar. 31, 1995

[51] Int. Cl.$^6$ ..................................................... G06F 17/30
[52] U.S. Cl. .......................... 395/614; 395/611; 395/500; 395/701; 395/774; 395/578
[58] Field of Search .............................. 395/600, 4, 614, 395/611, 500, 701, 774, 578

[56] References Cited

U.S. PATENT DOCUMENTS

| | | | |
|---|---|---|---|
| 5,129,087 | 7/1992 | Will | 395/650 |
| 5,247,669 | 9/1993 | Abraham et al. | 395/600 |
| 5,297,279 | 3/1994 | Bannon et al. | 395/600 |
| 5,410,688 | 4/1995 | Williams et al. | 395/600 |
| 5,437,027 | 7/1995 | Bannon et al. | 395/600 |
| 5,452,430 | 9/1995 | Dievendorff et al. | 395/183.13 |
| 5,467,472 | 11/1995 | Williams et al. | 395/600 |
| 5,475,817 | 12/1995 | Waldo et al. | 395/650 |
| 5,504,885 | 4/1996 | Alashqur | 395/600 |
| 5,504,895 | 4/1996 | Kurosawa et al. | 395/600 |
| 5,553,282 | 9/1996 | Parrish et al. | 395/600 |
| 5,555,376 | 9/1996 | Theimer et al. | 395/200.09 |
| 5,564,048 | 10/1996 | Eick et al. | 395/600 |
| 5,613,148 | 3/1997 | Bezviner et al. | 395/800 |

OTHER PUBLICATIONS

Rao, Bindu R., C++ and the OOP Paradigm, 1993, published by McGraw–Hill Inc., pp. 165–171.

Bruce Millard, Partha Dasgupta, Sanjay Rao, and Ravindra Kuramkote, "*Run–Time Support and Storage Management for Memory–Mapped Persistent Objects,*" Proceedings of 13th International Conference on Distributed Computing Systems, (Cat. 93CH3282-1), 25–28 May 1993, ISBN 0–8186–3770–6, IEEE Computer Society Press, Los Alamitos, CA.

Marc Shapiro, "*A Binding Protocol for Distributed Shared Objects,*" Proceedings of the 14th International Conference on Distributed Computing Systems, Jun. 21–24, 1994, ISBN 0–8186–5840–1, IEEE Computer Society Press, L Alamitos, CA.

Bindu R. Rao, "*C++ and the OOP Paradigm,*" 1993, McGraw–Hill, Inc., pp. 165–171.

Richard P. Gabriel, "Persistence in a programming environment: an object–oriented database can make the difference", Dr. Dobb's Journal, v17, n12, p46(6), Dec. 1992.

*Primary Examiner*—Thomas G. Black
*Assistant Examiner*—Jean M. Corriélus
*Attorney, Agent, or Firm*—Hickman Beyer & Weaver

[57] ABSTRACT

A number of methods and apparatus are disclosed for providing transparent persistence in a distributed object operating environment are disclosed. In general, the present invention teaches replacing the value in the object's data pointer (addressing information which points to the objects limited persistent memory) with a pointer value which points out to another persistent storage device. In preferred embodiments, a persistent storage manager (external and transparent to the distributed object) maintains the object data. In a specific embodiment, a distributed object framework is provided which has the mechanism for providing the transparent persistent strategy of the present invention. An object developer develops object implementations which the distributed object generates distributed objects with, in the process automatically providing transparent persistence.

27 Claims, 7 Drawing Sheets

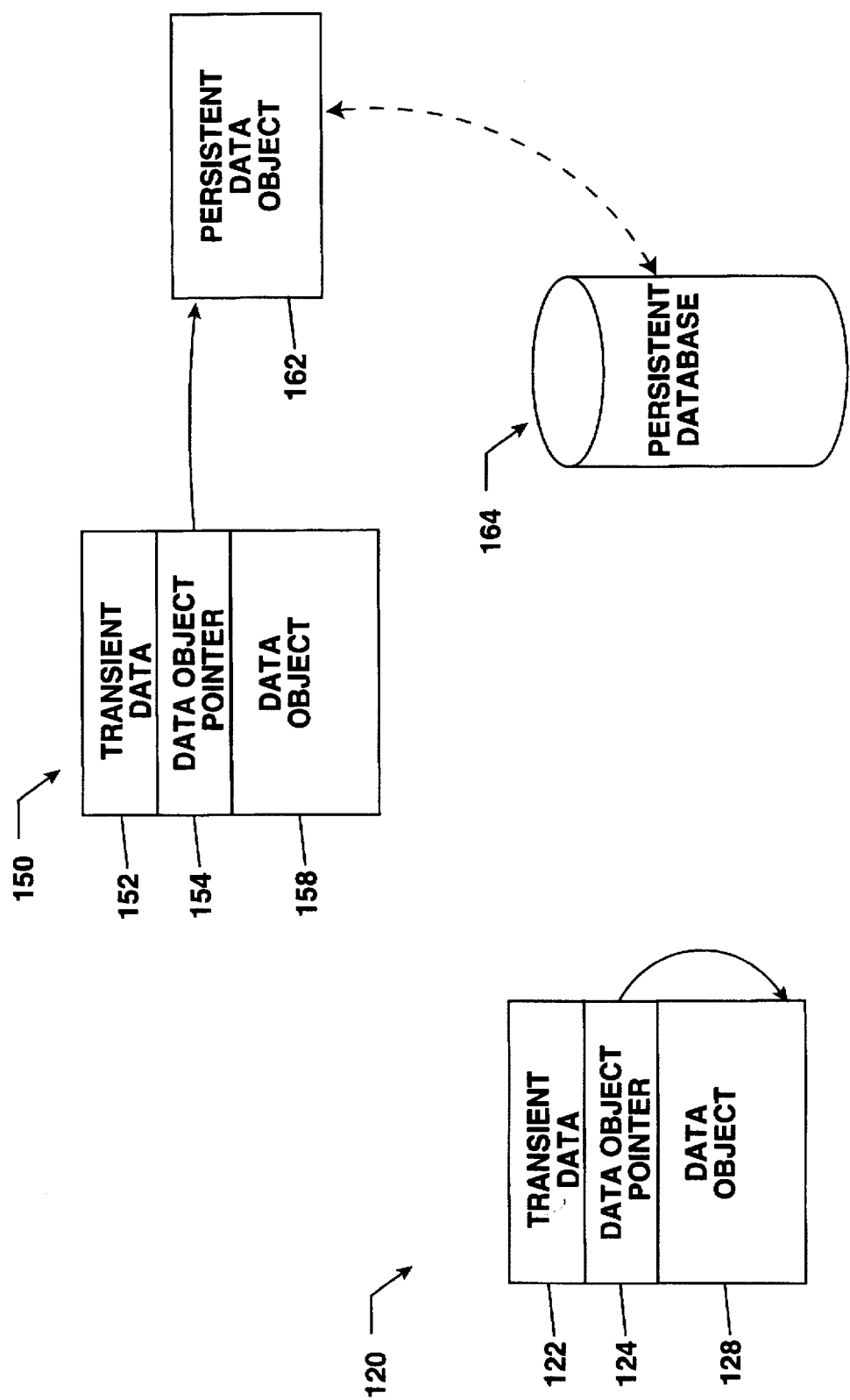

METHODS AND APPARATUS FOR PROVIDING TRANSPARENT PERSISTENCE IN A DISTRIBUTED OBJECT OPERATING ENVIRONMENT

BACKGROUND OF THE INVENTION

The present invention relates to the fields of distributed computing systems, client-server computing and object-oriented programming. More specifically, the present invention teaches methods and apparatus for providing transparent persistence within a distributed object operating environment.

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects and interfaces to be reused in different programs. Thus, programmers can develop libraries of "tried and true" objects and interfaces that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

Elaborating further on the distributed object operating environment, distributed objects can be object clients or object servers, depending upon whether they are sending requests to other objects or replying to requests from clients. In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service.

When a client calls a target object, certain procedures must be performed to ensure that the target object can perform the requested service. These procedures include identifying and locating the target object, starting the server process (if necessary) under which the target object resides, activating the target object (if necessary), and, finally, establishing a connection with the target object and passing the call. The ORB together with an Object Adapter (OA) is responsible for working with the client and the target object to perform these services.

From the perspective of the distributed object life cycle, objects fall into one of two categories: transient or persistent. When discussing the transient or persistent nature of an object, what is being referred to is the transient or persistent nature of the object's state. As will be well familiar to those skilled in the art of object oriented programming (OOP), an object may be described by two components: executable code and state. Executable code is essentially the instructions by which the object operates; it defines the "behavior" of the object. State is simply the remaining portion of the object such as data which is not code.

The majority of prior art teaching is directed towards transient objects. Transient objects typically have a short life span and are bound to a single host computer process. That is, when a host computer process ceases, all transient objects residing in the host computer process cease. Therefore there is no continuity of identity of a transient object from one process to another. Because transient objects are bound to a single process, they inherently cannot change their location. Hence transient objects could also be referred to as "immobile" objects, as their addresses may never change. A programmer whose object kinds include only transient objects is limited in preserving the object state from instance to instance.

In contrast, persistent objects are not bound to a single process and their address and memory location may change over time (e.g., they may have many "life" cycles). With a persistent object, there is a continuity of identity from one process to another. In brief, persistent objects are objects whose state can outlive the life of a specific instance of the object. As will be appreciated, persistent objects may provide many advantages to the object developer. Unfortunately, prior strategies for implementing persistent objects fall short of providing a satisfactory solution to the object developer, as will be described below. In what is perhaps the crudest strategy for providing persistent objects, the programmer codes within the object the reading and writing (i.e., the management) of data from a permanent storage medium such as a hard disk drive. While this strategy may work for simple scenarios, there are at least two glaring defects. First, the object developer bears the burden for implementing this data management into each persistent object. Second, this strategy has an abundance of unnecessary overhead. By way of example, each object must include the previously mentioned code for persistent data support. Furthermore, the structure of the data file may become quite intricate, demanding elaborate parsing just to read and write data. All of this data management must be done at execution time by the object, resulting in an expensive solution in terms of system resource utilization. Additionally, given the complexities of a distributed object operating environment, it would be extremely difficult for an object developer to implement their own persistent strategy. This is due, in part, to the nature of distributed objects which could have many surrogate objects located through out the system.

In another approach for providing persistent objects, persistence has been introduced into existing object programming languages. In one approach, an extension to the existing programming language provides an interface to the functionality of a database. For example, a compiler for an extended language using this approach might accept a specialized set of commands geared for use with a database. The most common type of database used with these methods is a relational database. As relational databases were not designed for storing data in a format in which object state is typically found, this may introduce its own set of dilemmas. Object oriented databases are available, but objects created by object oriented databases are not CORBA objects and so cannot take advantage of the CORBA guidelines. In any event, each of the prior art strategies places an undue burden on the programmer as they must still consciously manage the object data persistence.

Turning now to FIG. 1, a specific object designed according to the CORBA specification will be discussed. FIG. 1 shows a servant object 120 of a distributed object class including transient data 122, a data object pointer 124, and a data object 128. By way of background, a class is a template from which objects can be created. The class specifies the behavior and attributes common to all instances of the class. As will be appreciated by those skilled in the art of object oriented programming, when a new instance of a class is created, the memory for the instance variables is allocated. The servant object 120 is one instance of a distributed object. FIG. 1 diagrammatically illustrates the memory allocation of servant object 120. Note that this memory is contiguous. Transient data 122 is the memory portion of the servant object 120 which contains state (e.g., variables) which the object needs to use only as transient data.

By way of analogy, the transient data may be envisioned as a scratch pad area for use only by this instance of the servant object 120. Data object 128 is the memory portion of the instance which the object intends for use as persistent state. Initially when the servant object 120 is created, an object constructor will create the servant object 120 with transient data 122 and data object 128 initially empty. Both the initialization function (executed during creation) and the activation function (executed during activation) must perform any required initialization. As discussed previously, the object developer must incorporate some type of persistence strategy in order to maintain and call up the data object 128 so that the data is maintained through creation and the activation/deactivation cycles. One common method is to write elaborate initialization functions and activation functions which perform these tasks.

The CORBA specification does provide one possible hook for helping the object developer to manage persistent data. In an object adapter database (OAD), the ORB maintains, for each registered object, up to 1 kilobyte (Kbyte) of persistent portion of data that is termed the reference data. Upon activation, the object obtains a reference key which serves as a key for locating the appropriate reference data within the OAD. The developer can utilize the 1 Kbyte reference data to store the persistent data associated with data object 128, but the 1 Kbyte constraint may be unsuitable for many applications. Thus the object developer must implement a more elaborate persistence strategy. For example, a list of pointers directing the object to memory space containing the persistent data may work. Nevertheless within the CORBA specification, the burden of implementing a persistence strategy still rests on the object developer.

What is needed is a method and apparatus which will implement persistent data storage for traditional programming objects and distributed objects in such a way that the persistence mechanism is transparent to the object developer. That is, the persistence mechanism will be transparent persistence. As will be appreciated, transparent persistent objects may make the life of the object oriented programmer easier as the programmer will not have to implement the explicit loading and saving of state. Thus, what is needed is a method and apparatus for providing transparent persistent object support.

SUMMARY OF THE INVENTION

The present invention addresses the above-described limitations by providing methods and apparatus for providing persistent data support for objects in a distributed object operating environment. In particular, the methods and apparatus described herein relieve the object programmer from many of the burdens associated with the creation of persistence in objects by providing support for such persistence relatively transparently to the programmer.

In one aspect, the present invention includes a computer-implemented method for providing a distributed object having transparent persistent data support for use on a distributed object system. The method of the invention includes providing a servant object having an associated data object in which transient data can be stored and a data object pointer that indirects to the associated data object. The servant object inherits the data object from a data object class. The method also includes providing a persistent data storage mechanism having a persistent data object in which persistent data is stored, and a persistent data pointer that indirects to the persistent data object. Further, the value of the data object pointer is determined; and the data object pointer is located within the servant object and replaced with the persistent data pointer to produce thereby a distributed object having transparent persistent data support.

In a second aspect, the present invention provides a computer system for creating a distributed object having transparent persistent data support. The computer system of the invention includes a data compiler to compile data schema into a data object class and an implementation compiler to compile implementation files into compiled implementations. In addition, the computer system includes a final stage compiler to create a servant object constructor capable of creating a servant object, the servant object including a transient data space, a data object pointer and a data object, wherein the servant object inherits the data object pointer from the data object class. Further included is a persistent data storage mechanism that includes a persistent database, and a persistent data object that is an image of the persistent database. Finally the computer system includes a transparent persistence mechanism that includes a locator to find the value of the data object and the address space of the data object, and a replacement mechanism to swap the value of the data object in the address space with a pointer to the persistent data object.

In yet another aspect, the present invention includes a distributed object suitable for use on a distributed object system. The distributed object includes a transient data space for storing transient data, a data object and a persistent data pointer that indirects the reading and writing of persistent data from the data object to a persistent data object that is an image of a persistent database.

BRIEF DESCRIPTION OF THE DRAWINGS

The invention, together with further objects and advantages thereof, may best be understood by reference to the following description taken in conjunction with the accompanying drawings which are described below.

FIG. 1 is a diagrammatic illustration of the memory allocation of the instance variables of a servant object of the prior art.

FIG. 3 is a diagrammatic illustration of the memory allocation of the instance variables of a servant object in accordance with one embodiment of the present invention, the figure also shows a persistent data object which is a replica of a data object portion of the servant object which is mapped from a persistent database into transient memory both during creation and activation.

DETAILED DESCRIPTION OF THE INVENTION

Figure 4:
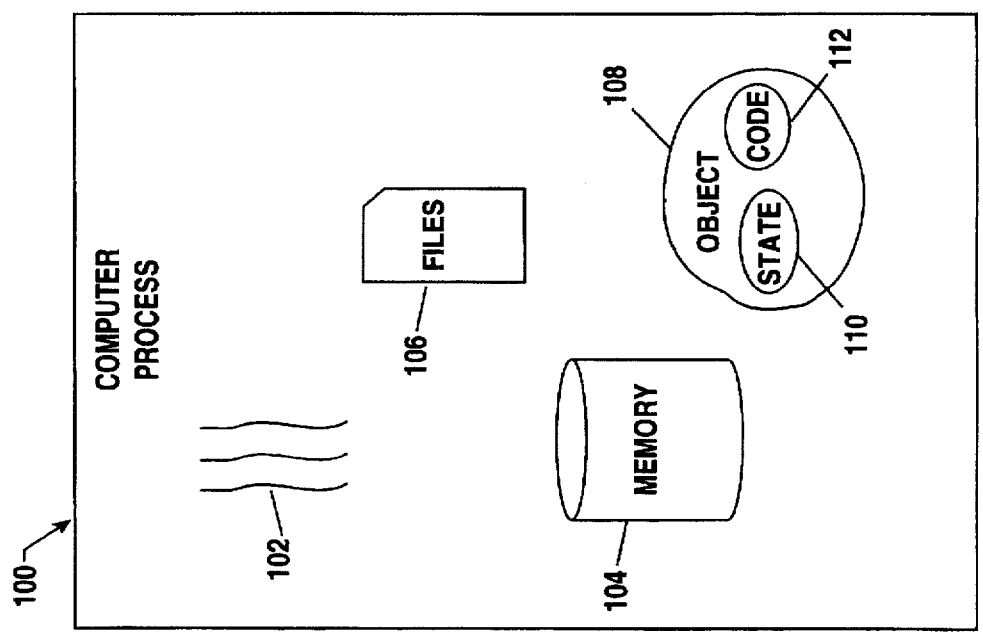
FIG. 4 is a pictorial illustration of a process in accordance with one embodiment of the present invention, wherein the process has multiple threads of execution, file identifiers, memory allocation, and an object resident therein.

The present invention relates to a distributed operating environment based on object oriented programming (OOP). More specifically, this invention discloses methods and apparatus for providing transparent persistence in a distributed object operating environment. Following the Definition of Terms, the methods and apparatus will be discussed in more detail, first through describing several embodiment of the apparatus of the present invention, next discussing example computer processes, networks, and computer systems which are suitable for the present invention, subsequently continuing with a detailed description of several further embodiments of the apparatus and data structures of the present invention, and then further through the detailed description of the method aspects of the present invention.

I. DEFINITION OF TERMS

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG's IDL. Second, distributed objects are location-independent, i.e., distributed objects can be located anywhere in a network. This contrasts sharply with traditional programming objects which typically exist in the same address space as the client. Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is an object that contains a pointer to another object. Additionally, an objref can include a portion of memory (the "sub-object identifier") which can be used for identifying a sub-object. With the exception of the sub-object identifier, the creation and definition of object references will be familiar to those skilled in the art. A "client" as defined herein refers to an entity that sends a request to second object. In this model, the second object is referred to as a "server object" or a "target object". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an IDL. As noted above, objects perform transactions through their interfaces. The use of interfaces therefore relieves the need of objects that are aware of the programming languages used to define the methods and data of the objects in the transaction.

To "marshal" a packet of information is to prepare this information for transfer both over a network communications line or via shared memory. This often means organizing the data in a particular format in accordance with the network communications protocol being used.

To "unmarshal" a packet of information is to essentially reverse the marshaling procedure and produce data in a format which is meaningful in a non-network environment.

As used herein, the phrase "transparent persistence" is the mechanism by which persistent data storage and management is transparently provided to an object developer.

II. TRANSPARENT PERSISTENCE

According to the present invention, a variety of methods and apparatus for providing transparent persistence to a programming object in a distributed object operating environment are disclosed. As used herein, the phrase "transparent persistence" is the mechanism by which persistent data storage and management is transparently provided to an object developer. In some embodiments, the present invention teaches transparently configuring the object's instance variable structure (especially the addressing information which points to the object's limited persistent memory) and automatically managing the object's related persistent data. In some embodiments, a persistent storage manager (external and transparent to the distributed object) maintains the persistent object data.

In one embodiment described herein, the transparent persistent strategy takes advantage of the nature of the object compilation and the principle of inheritance as follows. When an object developer declares data variables in their data schema it is done by way of a direct relationship. However, when the object developer's data schema is compiled into data object classes, the direct relationship is converted by the compiler into an indirection. (An "indirection" is a set of information, a pointer, etc., which directs the client entity to a source, e.g., a locator object, which can direct the client entity to the object. By way of analogy, if a client requested geographical directions, an indirection would point the client to the location of a current map, or perhaps provide the client with a phone number of a geographically astute individual.)

Thus, the direct relationship is converted so that upon object activation the relationship will instead be a data pointer that is inserted by the compiler and about which the object developer is unaware. The data pointer will indirect to a data object located in memory contiguous to the other instance variables. When the object is activated, thereby generating a single instance of the object class, the instance inherits behavior and attributes of the object class including the data pointer to the data object. The present invention teaches, upon object activation, creating a replica of a persistent data object and replacing the initial data pointer to the data object with a pointer to the persistent data object Objects can be object clients or object servers, depending upon whether they are sending requests to other objects or replying to requests from clients. In a distributed object environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment word in terms of objects in a distributed client-server environment, where server objects are capable of providing services to clients requesting the service. In the following discussion, the terms "object" and "distributed object" will often be used interchangeably. However, in general, distributed objects have the quality of being accessible (via the ORB) to clients throughout a distributed object operating environment, whereas non-distributed objects, such as C++ or SmallTalk object, are only available to clients resident in the same process as the common object. Those skilled in the art will be able to differentiate between the two either from the context or by an explicit identifying statement.

When a client calls an object, it must have addressing information corresponding to the object. In a non-distributed object oriented operating environment, clients can only interact with objects which are resident in the same address space, that is, within the same process. Thus the addressing information is typically just a pointer directing to the address space where the target object resides.

In a distributed object operating environment, however, the client must have an object reference for the desired target object (if it is a remote object). The object reference essentially contains sufficient addressing information to direct the client to the target object. The object reference addressing information may be direct addressing information. For example, the direct addressing information may include a host computer network address, a server process network port number, and a target object identifier. However, the addressing information may be an indirection or a combination of direct addressing information and an indirection.

For a more detailed description of addressing information, as well as suitable embodiments of different kinds of object references, please see Brownell et. al.'s copending U.S. patent application Ser. No. 08/408,954 entitled "METHODS, APPARATUS, AND DATA STRUCTURES FOR MANAGING OBJECTS", which is incorporated herein by reference in its entirety. Furthermore, one suitable embodiment for establishing and terminating connections between objects in a distributed object operating environment is disclosed in Brownell et. al.'s copending U.S. patent application Serial No. 08/408,316 entitled "METHOD AND APPARATUS FOR MANAGING CONNECTIONS FOR COMMUNICATION AMONG OBJECTS IN A DISTRIBUTED OBJECT SYSTEM" which is incorporated herein by reference.

When a client calls a target object, certain procedures must be performed to ensure that the target object can perform the requested service(s). These procedures include identifying and locating the target object, starting the server process (if necessary) under which the target object resides, activating the target object if necessary, coordinating the target object's persistent state with its implementation (if necessary), and, finally, establishing a connection with the target object and passing the call. The ORB together with an Object Adapter (OA) is responsible for working with the client and the target object to perform these services.

In preferred embodiments of the present invention, the transparent persistence mechanisms of the present invention are implemented automatically by an object development framework which the object developer uses to develop distributed objects. One such framework is described in more detail in Snyder et. al.'s copending U.S. patent application Ser. No. 08/414,240 entitled "METHOD AND APPARATUS FOR GENERATION AND INSTALLATION OF DISTRIBUTED OBJECTS ON A DISTRIBUTED OBJECT SYSTEM" which is incorporated herein by reference in its entirety. One suitable object development framework is available from SunSoft (Mountain View, Calif.). As will be appreciated by those skilled in the art, the object oriented principles of inheritance may be used to enable the object development framework to transparently provide the present invention to the distributed object.

As background, an object "class" is a template from which an object can be created. It is used to specify the behavior and attributes common to all objects of the class. The mechanism by which new classes are defined from existing classes is "inheritance.""Subclasses" of a class inherit operations of their parent class. As is well known, "inheritance" is a mechanism by which reusability is facilitated.

Figure 2:
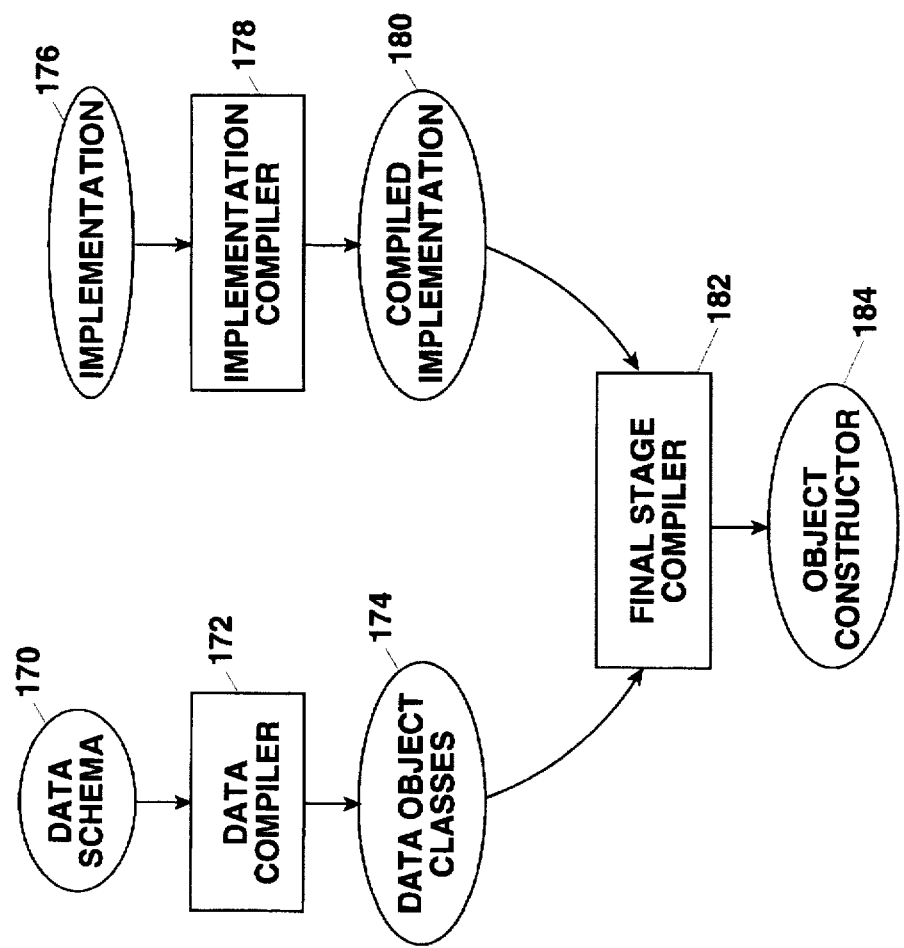
FIG. 2 is a diagrammatic illustration of one paradigm for the compilation of the object constructor, the object constructor being used to create an instance of an object in accordance with one embodiment of the present invention.

FIG. 2 illustrates one possible flow of the creation of an object in accordance with one embodiment of the present invention. A data schema 170 is authored by the object developer. The data schema 170 defines and describes all the object variable structures and the natures thereof. The data schema 170 is then processed by a data compiler 172 to produce data object classes 174. Thus the data object classes 174 describe the behavior and attributes of the data for the object being developed. In particular, the data object classes contain the values of data object pointers, the significance of which will be described in greater detail below.

An implementation 176 is written by the object developer which defines the behavior and attributes of the object being developed. The implementation 176 is compiled by an implementation compiler 178 to produce a compiled implementation 180. Note that data schema 170, data object classes 174, implementation 176, and compiled implementation 180 are typically files written by the object developer or created by the compilers accordingly.

In particular, those of skill in the art will appreciate that during compilation statements referring to a data object are replaced by pointers to the data object. For example, during compilation a statement such as "x.a" where x is the servant and a is the data object member will be replaced by a statement such as "x.dop→a" where "dop" is the data object pointer whose value is found in the data object class. Thus, if the servant inherits the data object the pointer will indirect data operations (i.e., read and write operations) to the appropriate data object.

The data object classes 174 and the compiled implementation 180 are then processed by another stage of the compiler 182 to produce an object constructor 184. As will be appreciated by those skilled in the art, executing the object constructor 184 will produce an instance of the desired object.

A representation of a servant object 150 in accordance with one embodiment of the present invention will be described now with respect to FIG. 3. FIG. 3 shows the servant object 150 of a distributed object class including transient data 152, a data object pointer 154, and a data object 158. In one embodiment, the servant inherits the data object. Thus, as will apparent to those of skill in the art, the value of data object pointer 154 is held in the data object class. This, of course, allows for the creation of multiple servants with an economy of effort since all of the created servants inherit the value of the data object pointer from the same data object class.

The servant object 150 is one instance of a distributed object in accordance with one embodiment of the present invention. As will be appreciated by those skilled in the art of object oriented programming, when a new instance of a class is created, the memory for the instance variables is allocated. FIG. 3 diagrammatically illustrates the memory allocation of servant object 150. Transient data 152 is the memory portion of the servant object 150 which contains state (e.g. variables) which the object needs to use only as transient data. By way of analogy, the transient data may be envisioned as a scratch pad area for use only by this instance of the servant object 150. Data object 158 is the memory portion of the instance which the object developer intended for use as persistent state. This region of memory is pointed to by data object pointer 154, which is inherited from the above-described data object classes.

Initially, when the servant object 150 is created, an object constructor, such as object constructor 184, will create the servant object 150 with transient data 152 and data object 158 in an initialized state (which may be random values left in the memory allocated to the data object or initialized to zero, etc.) Both the initialization function (executed during creation) and the activation function (executed during activation) must perform any required initialization. As described above, this requires the programmer to bear the burden of providing the necessary functions to implement persistence.

However, according to preferred embodiments of the present invention, the original data object pointer 154 which pointed to the data object 158 (as in FIG. 1) is replaced during either creation or activation with a persistent storage manager data object pointer 154 which points out to an area of memory holding a replica of the data object 158 called the persistent data object 162. The replica persistent data object 162 is mapped out of persistent storage such as a persistent database 164 when the object is either created or activated. The stored form of the persistent data object 162 is generated during creation and is maintained within the persistent database 164 until the object is deleted. Suitable methods for creating, activating, and deleting an object implementing transparent persistence in accordance with the present invention will be described in more detail below with reference to FIGS. 7-10.

In preferred embodiments the persistent data storage 164 is managed by a persistent storage manager. A suitable embodiment of the persistent storage manager is described in Hapner et. al.'s copending U.S. patent application Ser. No. 08/414,119 entitled "METHODS AND APPARATUS FOR MANAGING A DATABASE IN A DISTRIBUTED OBJECT OPERATING ENVIRONMENT" which is incorporated herein by reference in its entirety.

Distributed objects, as contemplated by the present invention, are implemented (by the ORB and/or the host computer) under computer processes. Computer processes provide a well known and common framework under which computer systems implement different threads of execution. By way of analogy, a computer process can be thought of as a domain partitioned within a computer system.

In actuality, a process typically includes address space (i.e. a portion of memory allocated to only the process), a set of file descriptors, a process identification number, and one or more threads of execution (often referred to as threads). Multithreaded systems, such as contemplated in one embodiment of the present invention, allow for multiple threads to run concurrently in a single process. For a more detailed description of threads, multi-threaded processes, and principles of concurrency, please see "Concurrency Within DOE Object Implementations" by Dr. Robert Hagmann, Version 0.91, May 27, 1993, published by SunSoft and incorporated herein by reference in its entirety.

FIG. 4 illustrates an embodiment of the present invention including a multi-threaded process 100 in accordance with one embodiment of the present invention. The process 100 may be implemented on a computer such as computer 30 and includes multiple threads such as thread 102, allocated memory 104 which may include both persistent and transient memory, file identifiers 106, and at least one object such as object 108. The object 108 includes state 110 and code 112. The object 108 is typically defined by the state 110 and the code 112. Code 112 is essentially the operating instructions by which the object executes. State 110 is thus the remaining portion which is not executable code. As will be appreciated, the state 110 is generally what the transparent persistence of the present invention is directed towards. In some embodiments of the present invention, a persistent storage manager maintains a single database accessible to a plurality of distributed objects residing in a plurality of processes.

Figure 5:
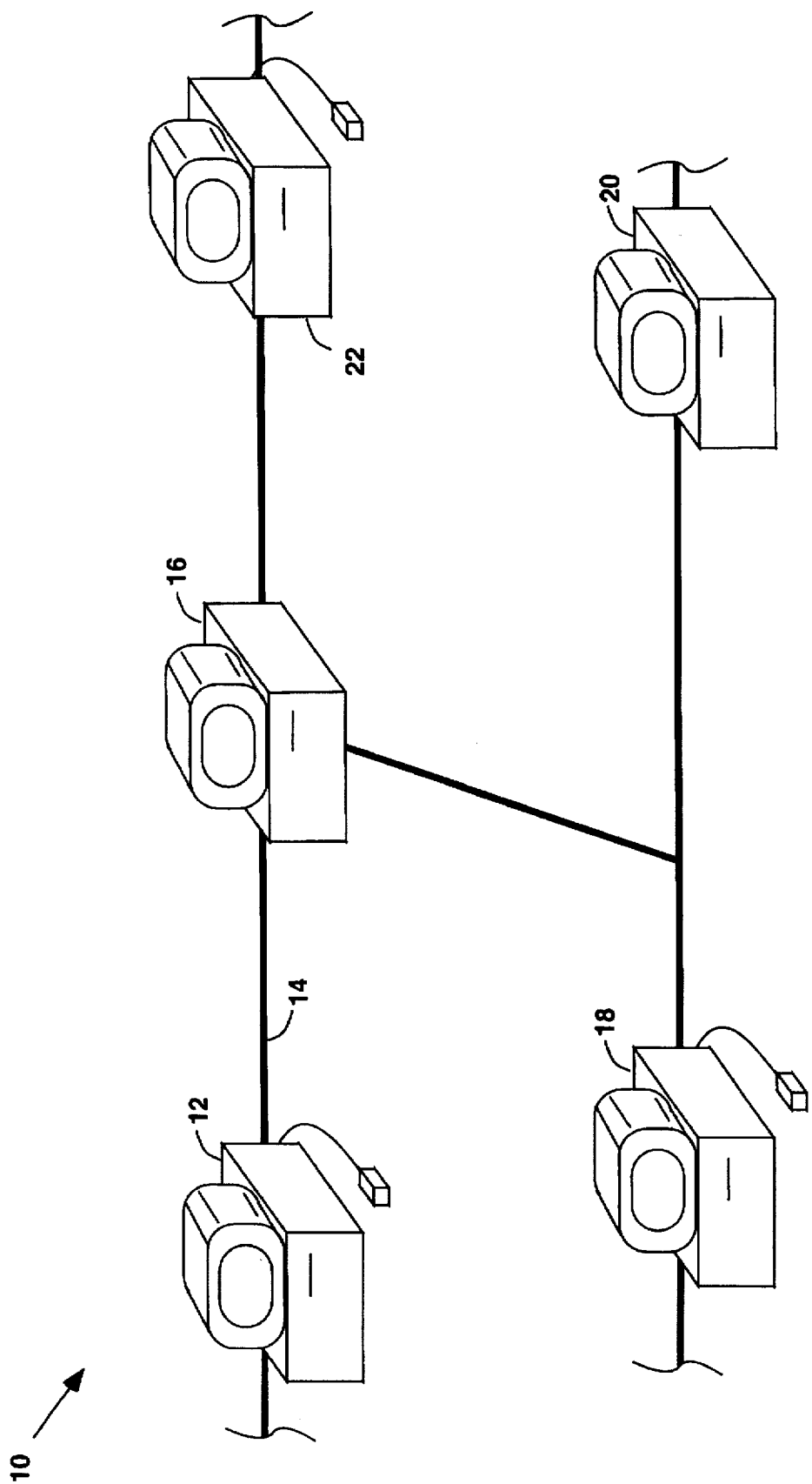
FIG. 5 is a pictorial illustration of various computers linked together in a computer network.

In a preferred embodiment of the present invention, distributed objects, computer processes, and clients of the distributed objects are resident on one or more computers linked together by a network. The network may take any suitable form. By way of example, a representative network arrangement 10 is illustrated in FIG. 5. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 6:
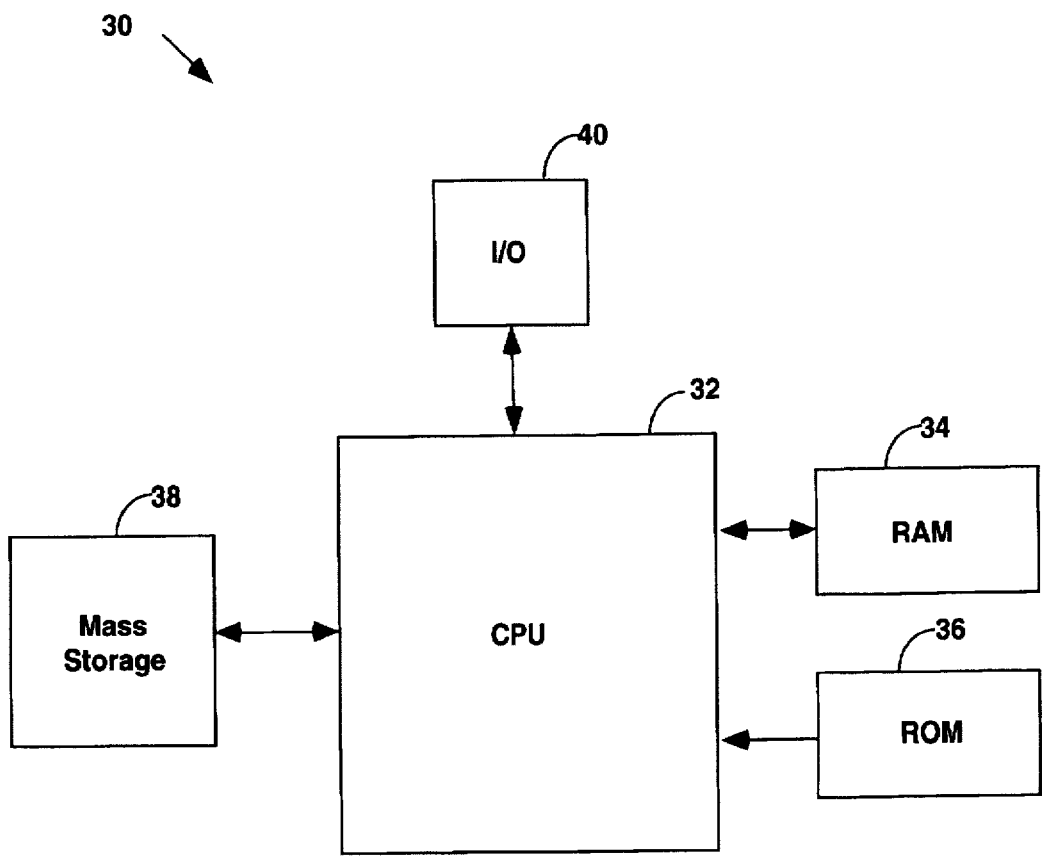
FIG. 6 illustrates diagrammatically the major components of a computer in FIG. 5.

A representative computer 30 suitable for use as computers 12, 18, 20, and/or 22 of FIG. 5 is illustrated schematically in FIG. 6. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers optionally includes input/output sources 40 that typically include input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices, are of standard design and construction, and will be well familiar to those skilled in the art.

Figure 7:
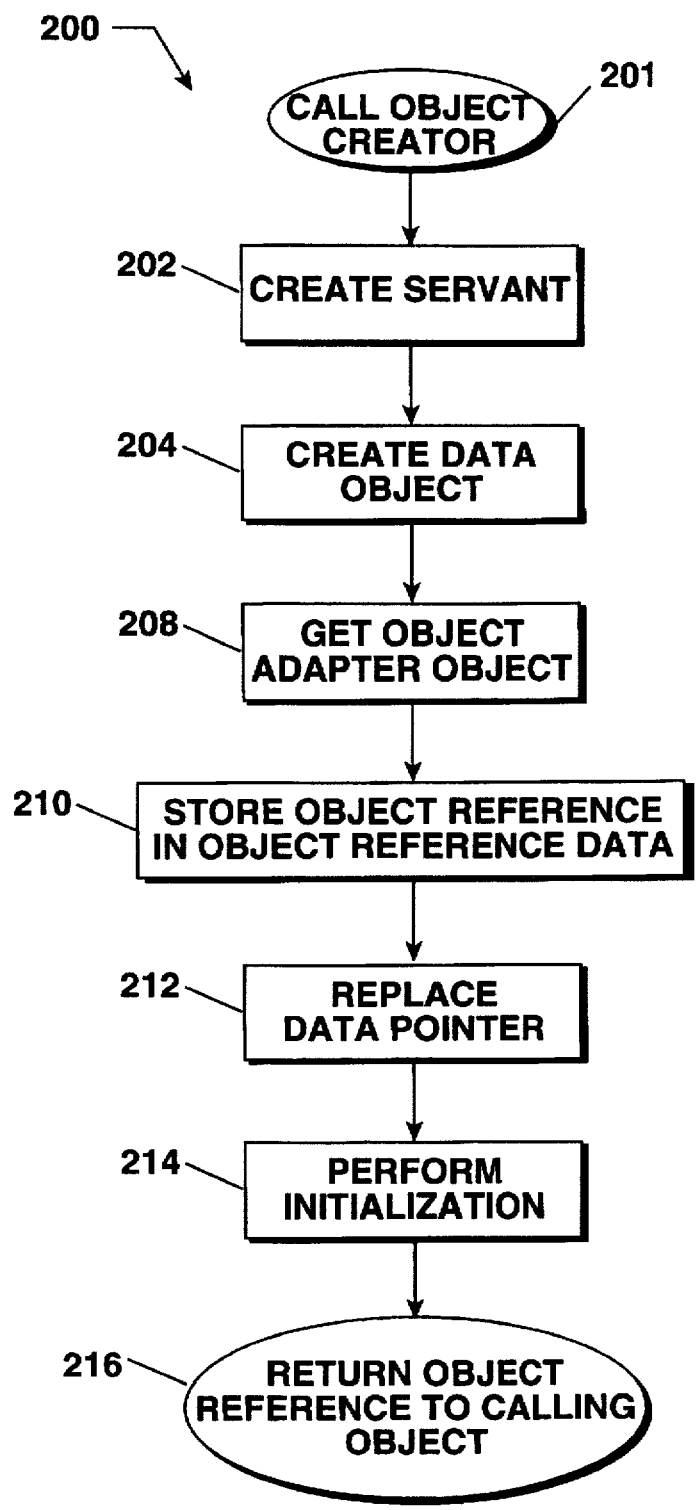
FIG. 7 is a flow chart illustrating a method for creating an instance of a distributed object utilizing transparent persistence in accordance with one method aspect of the present invention.

One method 200 for creating an object having transparent persistence in accordance with the present invention is described now with reference to FIG. 7. The transparent persistence method 200 is for use in a variety of systems. By way of example, this method is well suited for use in distributed object operating environments based on the CORBA specification. The method 200 begins in a step 201 when an object creator is called to create the object. As will be appreciated by those skilled in the art, generally a factory class of an object is utilized to create the object. Typically upon object installation, a single instance of the factory class is created and resides in a server process accessible by the appropriate clients. In some cases, clients which intend to request services may call this factory servant object to create an instance of the object for their own use. In other cases, the ORB may call the creator in response to a client requesting services.

In any event, in a step 202 a servant object 150 is created. This is typically done by running an object constructor as discussed previously. In step 202 a contiguous portion of memory is allocated for the servant object 150 including memory for transient data 152, data object pointer 154, and data object 158. As discussed above, the value for the data object pointer 154 is inherited from the data object class.

As allocated initially, the data object pointer 154 directs to the data object 158. Then, in a step 204, a persistent data object 162 is created. In preferred embodiments the persistent data object 162 (which is a replica of the data object programmed by the object developer) is mapped from storage in a persistent database 164 where it is maintained by a persistent storage manager. In step 204, the persistent data object 162 is mapped into transient memory such as RAM 34. As will be appreciated by those skilled in the art, copying the persistent object data 162 into RAM 34 will enable quicker read/write operations then if maintained in persistent storage.

In a next step 208, the object adapter object is obtained. This step includes registering the servant object 150 with the ORB and receiving an object reference in return. Generating an object adapter object may be performed by well known methods. By way of example, the CORBA standard provides one suitable guideline for generating distributed objects such as required in step 208. Then, in a step 210, the object reference is stored in the object reference data maintained by the ORB on the servant object 150's host computer. In step 212, the initial data object pointer 154 is replaced with a persistent data pointer 154 which points out to the persistent data object 162 which was generated earlier in step 204. A more detailed description of one embodiment of step 212 is described below with respect to FIG. 8.

Next, in a step 214, the initialization procedures are performed. This may include such steps as setting the variable to initial values and reading in persistent data. The initialization procedure is authored (at least in part) by the object developer and may be unique to object creation. That is, different functions may be performed during creation initialization step 214 than during activation. At this point the object is created, active, and able to accept requests for service, so in a step 216 the object reference is returned to the client which initiated the creation method 200.

Figure 8:
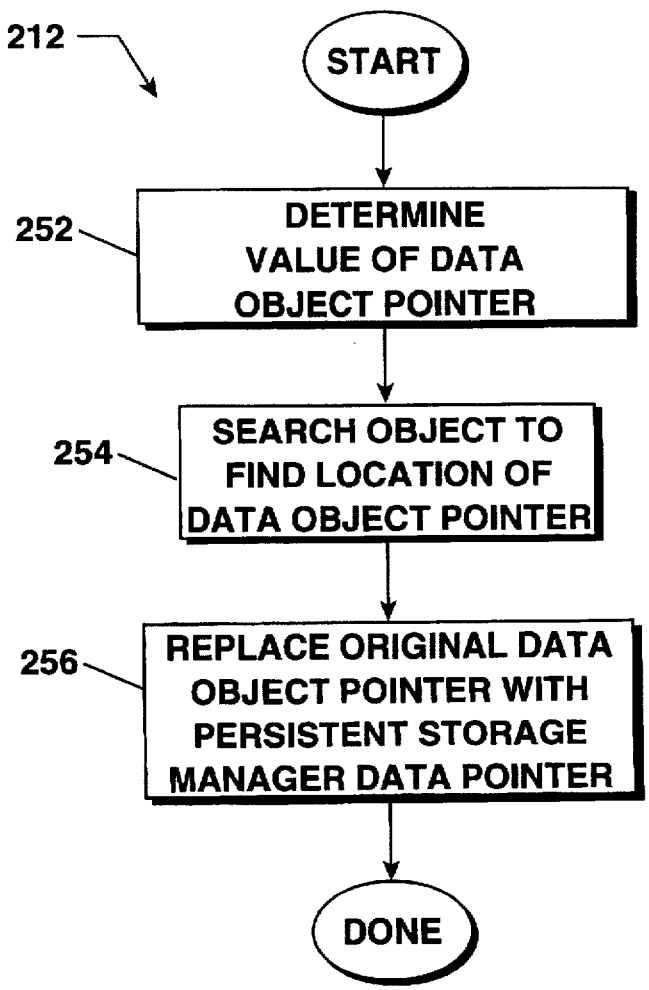
FIG. 8 is a flow chart illustrating a more detailed description of one embodiment of step 212 of FIG. 7.

One embodiment of a data pointer replacement step 212 of FIG. 7 is described in more detail now with reference to FIG. 8. By way of background, the embodiment of FIG. 8 is suitable for use in state of the art object oriented programming languages such as C++ and SmallTalk. As these languages were not originally designed for distributed object operating environments or persistence strategies, the method of FIG. 8 provides one strategy for enabling the methods of the present invention in currently available programming frameworks. As will be appreciated by those skilled in the art, when other programming languages are used, the mechanisms of the data pointer replacement step 212 may be varied appropriately.

The data pointer replacement method 208 of FIG. 8 begins when a step determines the value of the data pointer 154. As discussed previously with reference to FIG. 2, certain characteristics of the distributed object are "inherited" from "parent" classes. In this case, the data pointer 154 is inherited from the data object class. As a result of the structure of current object oriented programming languages (e.g. C++ and SmallTalk) and the nature of inheritance, the address of the data pointer 154 is "hidden", or unavailable to the distributed object. Furthermore, the address of the data pointer 154 is not constant during the life cycle of the distributed object. This is, in part, because during its different activation/deactivation cycles a distributed object may be resident in different memory space (i.e. different addresses) during each activated phase. In general, the memory space allocated to the object upon activation is known by the ORB, but it doesn't know the specific location of the data pointer 154.

However, as is well known, by performing the appropriate "widening" functions the value of the data pointer 154 can be obtained from the data object class. So once the value of the data pointer 154 is obtained in step 252, a step 254 will search the memory location of the distributed object to find the address space which contains the same value as found in step 252. The addressing information found in step 254 enables a step 256 to replace the value in the data pointer field 154 with a new data object pointer 154. In one embodiment, the data object pointer 154 is provided by a persistent storage manager which maintains the data in persistent memory. For more details on the persistent storage manager, please see copending U.S. patent application Ser. No. 08/414,119. In any event, once the data object pointer 154 has been replaced, the method of FIG. 8 is complete.

It should be pointed out that in performing the search step 254 there is a very small risk that the value obtained in the value determination step 252 is not unique within the memory space allocated to the distributed object. Therefore in some embodiments a complete search of the memory space may be performed in step 254 in order to verify uniqueness. However, it is believed that the risk is so small that in most embodiments the extra verification step is unnecessary. As will be appreciated, obvious modifications of the method of FIG. 8 may be appropriate for use with different object oriented programming languages. For example, in some instances an object oriented programming language might provide a mechanism for directly obtaining the address of the data pointer 154. In this case the search of step 254 is unnecessary and the risk discussed at the beginning of this paragraph is eliminated.

Figure 9:
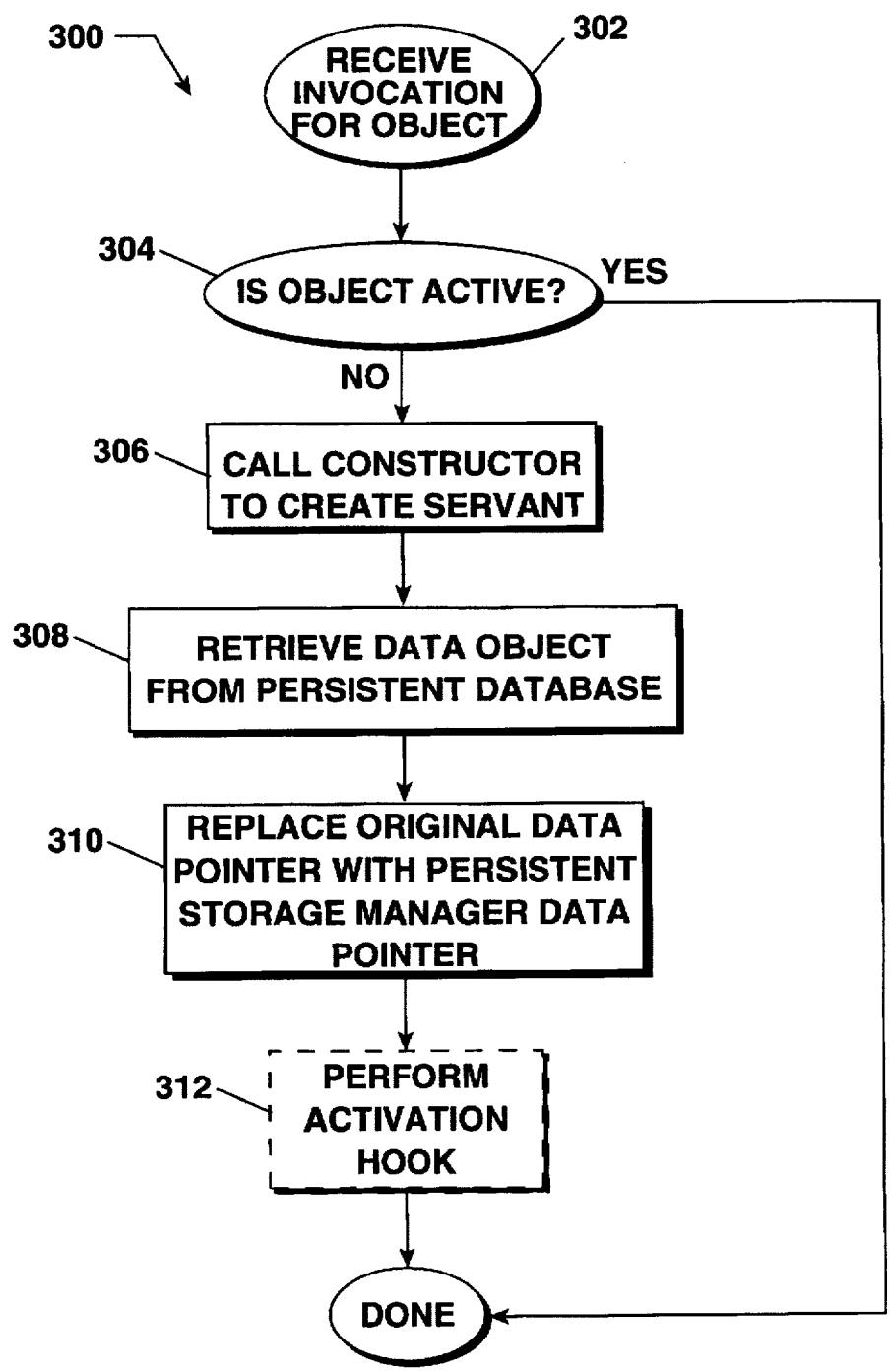
FIG. 9 is a flow chart illustrating a method for activating an object utilizing transparent persistence in accordance with one method aspect of the present invention.

A method 300 for activating an object in accordance with one aspect of the present invention will be described now with reference to FIG. 9. In a step 302, an invocation for the object is received. The invocation may be received by the server process under which the object is intended to reside. Then, in a step 304, the server process determines if the object is active. If the object is already active, then the persistent data object 162 is already in place and the data object pointer 154 has been swapped as described above. Therefore the steps of activation relevant to the present invention have already been performed and the activation method 300 is complete.

If the object is inactive, then, in step 306, the constructor is called to create a servant object 150. In step 306 a contiguous portion of memory is allocated for the servant object 150 including memory for transient data 152, data object pointer 154, and data object 158. As allocated initially, the data object pointer 154 directs to the data object 158. Note that step 306 of FIG. 9 is analogous to step 202 of FIG. 7. Then, in a step 308, a persistent data object 162 is retrieved from storage in a persistent database 164 and mapped into transient memory such as RAM 34. As will be appreciated by those skilled in the art, copying the persistent object data 162 into RAM 34 will enable quicker read/write operations then if maintained in persistent storage. Note that this step is similar to the create data object step 204 of FIG. 7. However in the retrieve step 308, the data object replica has already been created so it can be read directly from the persistent database 164. When the data object 162 has been mapped into memory its address is known, so therefore in a step 310 the original data object pointer 154 is replaced with a data object pointer which points to the persistent data object 162 using the method described above. After the pointer replacement step 310, in step 312 any activation initialization steps are performed. In some embodiments an activation hook is programmed by the object developer and defines all the necessary functions which must be performed upon activation. Note that the activation hook is not necessarily identical to the initialization performed in the initialization step 214 of object creation 200 in FIG. 7.

Figure 10:
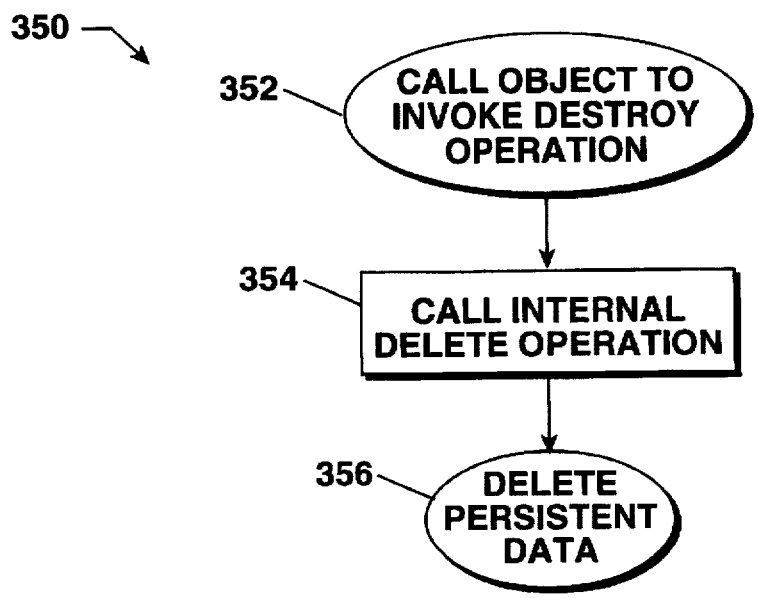
FIG. 10 is a flow chart illustrating a method of deleting an object utilizing transparent persistence in accordance with one method aspect of the present invention.

One method 350 for deleting an object in accordance with one embodiment of the present invention will be described now with reference to FIG. 10. In a first step 352, a client calls the object to invoke a "destroy" operation. By way of explanation, it is a sound programming strategy to have object deletion (even if initiated externally) be a self-performed act. This insures an orderly shutdown and deletion as defined by the object developer. Therefore the object will have an operation such as "destroy" available to clients through its interface (As opposed to an entity independent of the object deleting the object). Objects may be deleted for a variety of reasons such as non-activity or replacement. One suitable method for systematically deleting objects when they (or the process they reside in) become inactive is described in Snyder et. al.'s copending U.S. patent application Ser. No. 08/414,923 which is incorporated herein by reference in its entirety.

In any event, once the object receives a request to self-destroy, in a step 354 it performs its internal delete operation. This may include systematic deactivation steps such as completing all pending service requests while blocking out any new requests and broadcasting a final message indicating that deletion is completed. One suitable method for deactivating an object is described in Yeturu Aahlad's copending U.S. patent application Ser. No. 08/408,627 entitled "METHODS AND APPARATUS FOR MANAGING DEACTIVATION AND SHUTDOWN OF A SERVER", which is incorporated herein by reference in its entirety. In a next step 356, the persistent data associated with the object is deleted. This may be performed by the object itself during the destroy operation, or may be done by the persistent storage manager after the object has performed the destroy operation, or may be performed by other computer entities such as the operating system. In any event, once the object and its persistent data has been deleted the method 350 of FIG. 10 is complete.

Although only a few embodiments of the present invention have been described, it should be understood that the present invention may be embodied in many other specific forms without departing from the spirit or scope of the invention. For example, the embodiment of FIG. 2 simply provides one sample object development procedure. However, as will be appreciated by those skilled in the art, many other object development procedure may be used to implement the methods and apparatus of the present invention In the embodiment described with reference to FIG. 9, the transparent persistence method 300 is initiated by a client calling the distributed object. However, other suitable events may initiate the method of FIG. 9. For example, a distributed object may be self-activating. Furthermore, there may be other determination steps which occur before implementing the replace data pointer step 310. By way of example, there may be activation circumstances under which the object data of a previous activation should be ignored. In this case, a different pointer may be returned to the distributed object, providing it with a "new" location to store its persistent data. Therefore, the present examples are to be considered as illustrative and not restrictive, and the invention is not to be limited to the details given herein, but may be modified within the scope of the appended claims.

What is claimed is:

1. A computer-implemented method for providing transparent persistent data support to distributed objects instantiated within a distributed object system wherein an instance of a servant object class is instantiated having a transient data portion in which transient data can be stored and a data object in which a finite, predefined amount of persistent data can be stored, the method comprising the steps of:

a) providing a particular servant object that is a particular instance of the servant object class, the particular servant object having an associated transient data portion in which transient data can be stored, an associated data object in which a finite, predefined amount of persistent data can be stored and a data object pointer that indirects to the associated data object, wherein the particular servant object inherits the data object from a data object class;

b) providing a persistent data storage mechanism having a persistent data object in which persistent data can be stored and a persistent data pointer that indirects to the persistent data object, the amount of persistent data which can be stored in the persistent data object substantially exceeding the finite, predefined amount of persistent data which can be stored in the associated data object, the persistent data storage mechanism operating independent of the particular servant object;

c) determining the value of the data object pointer; and d) locating the data object pointer within the particular servant object and replacing the data object pointer with the persistent data pointer thereby providing transparent persistent data support to the particular servant object.

2. The computer-implemented method of claim 1, wherein the persistent data storage mechanism comprises a persistent database which is coupled to the persistent data object.

3. The computer-implemented method of claim 2, wherein the persistent database mechanism includes a persistent storage manager.

4. The computer-implemented method of claim 1, wherein said step of determining comprises the step of performing a widening function on the particular servant object to determine thereby the data object pointer in the data object class.

5. The computer-implemented method of claim 4, wherein the step of locating comprises searching the memory location of the particular servant object to obtain the location of an address space containing a value identical to the data object pointer.

6. The computer-implemented method of claim 5, wherein said step of locating further comprises the step of searching the entire memory space of the particular servant object to verify the uniqueness of the address of the data object pointer.

7. The computer-implemented method of claim 1, wherein the particular servant object is a distributed object located in the memory of a computer on a distributed object system, which distributed object system includes a plurality of networked computers having memories in which distributed objects and clients are located and which distributed objects communicate using an object request broker mechanism and an object adapter mechanism.

8. The computer-implemented method of claim 7, wherein the steps a)–d) are performed in response to an invocation of the particular servant object by a client on the distributed object system.

9. The computer-implemented method of claim 7, wherein the steps a)–d) are performed during the creation and installation of the particular servant object on the distributed object system.

10. A distributed object having transparent persistent data support formed by the computer-implemented method of claim 1.

11. A method as recited in claim 1 wherein the distributed object system adheres to the CORBA specification and the particular servant object is a CORBA object.

12. A computer program stored on a computer readable medium, the execution of the computer program suitable for providing transparent persistent data support to distributed objects instantiated within a distributed object system wherein an instance of a servant object class is instantiated having a transient data portion in which transient data can be stored and a data object in which a finite, predefined amount of persistent data can be stored, the computer program comprising computer executable instructions for:

a) providing a particular servant object that is a particular instance of the servant object class, the particular servant object having an associated transient data portion in which transient data can be stored, an associated data object in which a finite, predefined amount of persistent data can be stored and a data object pointer that indirects to the associated data object, wherein the particular servant object inherits the data object from a data object class;

b) providing a persistent data storage mechanism having a persistent data object in which persistent data can be stored and a persistent data pointer that indirects to the persistent data object, the amount of persistent data which can be stored in the persistent data object substantially exceeding the finite, predefined amount of persistent data which can be stored in the associated data object, the persistent data storage mechanism operating independent of the particular servant object;

c) determining the value of the data object pointer; and d) locating the data object pointer within the particular servant object and replacing the data object pointer with the persistent data pointer thereby providing transparent persistent data support to the particular servant object.

13. A computer program as recited in claim 12, wherein the persistent data storage mechanism comprises a persistent database which is coupled to the persistent data object.

14. A computer program as recited in claim 13, wherein the persistent database mechanism includes a persistent storage manager.

15. A computer program as recited in claim 12, wherein said computer executable instruction for determining comprises the step of performing a widening function on the particular servant object to determine thereby the data object pointer in the data object class.

16. A computer program as recited in claim 15, wherein the computer executable instruction for locating comprises searching the memory location of the particular servant object to obtain the location of an address space containing a value identical to the data object pointer.

17. A computer program as recited in claim 16, wherein the computer executable instruction for locating further comprises searching the entire memory space of the particular servant object to verify the uniqueness of the address of the data object pointer.

18. A computer program as recited in claim 12, wherein the particular servant object is a distributed object located in the memory of a computer on a distributed object system, which distributed object system includes a plurality of networked computers having memories in which distributed objects and clients are located and which distributed objects communicate using an object request broker mechanism and an object adapter mechanism.

19. A computer program as recited in claim 18, wherein the computer executable instructions a)–d) are performed in response to an invocation of the particular servant object by a client on the distributed object system.

20. A computer program as recited in claim 18, wherein the steps a)–d) are performed during the creation and installation of the particular servant object on the distributed object system.

21. A distributed object having transparent persistent data support formed by execution of the computer program of claim 12.

22. A computer program as recited in claim 12, wherein the distributed object system adheres to the CORBA specification and the particular servant object is a CORBA object.

23. A computer system operating under a distributed object system wherein an instance of a servant object class is instantiated having a transient data portion in which transient data can be stored and a data object in which a finite, predefined amount of persistent data can be stored, the computer system comprising:

a central processing unit;

a persistent data storage device;

a transient data storage device;

a particular servant object that is a particular instance of the servant object class, the particular servant object having an associated transient data portion in which transient data can be stored, an associated data object in which a finite, predefined amount of persistent data can be stored and a data object pointer that indirects to the associated data object, wherein the particular servant object inherits the data object from a data object class;

a persistent data storage mechanism having a persistent data object in which persistent data can be stored and a persistent data pointer that indirects to the persistent data object, the amount of persistent data which can be stored in the persistent data object substantially exceeding the finite, predefined amount of persistent data which can be stored in the associated data object, the persistent data storage mechanism operating independent of the particular servant object;

a data object pointer swapping mechanism operable to determine the value of the data object pointer, locate the data object pointer within the particular servant object and replace the data object pointer with the persistent data pointer thereby providing transparent persistent data support to the particular servant object.

24. A computer system as recited in claim 23 wherein the persistent data storage mechanism comprises a persistent database which is coupled to the persistent data object.

25. A computer system as recited in claim 24, wherein the persistent database mechanism includes a persistent storage manager.

26. A computer system as recited in claim 23, wherein the computer system is one of a plurality of networked computer systems.

27. A computer system as recited in claim 23 wherein the distributed object system adheres to the CORBA specification and the particular servant object is a CORBA object.

* * * * *